United States Patent [19]

Harada et al.

[11] Patent Number: 5,099,406
[45] Date of Patent: Mar. 24, 1992

[54] DC-DC CONVERTER WITH SURGE VOLTAGE PREVENTION

[75] Inventors: Kosuke Harada, Fukuoka; Hiroshi Sakamoto, Ohnojo, both of Japan

[73] Assignee: Kyushu University, Fukuoka, Japan

[21] Appl. No.: 547,286

[22] Filed: Jul. 3, 1990

[30] Foreign Application Priority Data

Sep. 5, 1989 [JP] Japan .................................. 1-228194

[51] Int. Cl.⁵ .......................................... H02M 3/335
[52] U.S. Cl. ......................................... 363/20; 363/56; 363/98; 363/127
[58] Field of Search .................... 363/127, 56, 20, 21, 363/26, 17, 97, 98

[56] References Cited

U.S. PATENT DOCUMENTS

| | | | |
|---|---|---|---|
| 3,621,363 | 11/1971 | Ginnman | 363/56 |
| 4,336,587 | 6/1982 | Boettcher et al. | 363/134 |
| 4,441,146 | 4/1984 | Vinciarelli | 363/20 |
| 4,607,322 | 8/1986 | Henderson | 363/56 |
| 4,618,919 | 10/1986 | Martin, Jr. | 363/21 |
| 4,809,148 | 2/1989 | Barn | 363/20 |

FOREIGN PATENT DOCUMENTS

| | | | |
|---|---|---|---|
| 1956145 | 5/1971 | Fed. Rep. of Germany | 363/56 |
| 883339 | 2/1980 | U.S.S.R. | 363/134 |

*Primary Examiner*—William H. Beha, Jr.
*Assistant Examiner*—B. Dunn
*Attorney, Agent, or Firm*—Spencer & Frank

[57] ABSTRACT

The disclosed power source apparatus includes a direct current (DC) source connected to the primary side of a transformer through a main switching element, a shunt circuit connected in parallel to the main switching element the shunt circuit being a serial circuit having an auxiliary switching element and a capacitor, and a control circuit connected to the main switching element so as to operate the main switching element at a duty ratio for generating a pulse-width-modulated output voltage at the secondary-side of the transformer depending on the duty ratio. The control circuit is also connected to the auxiliary switching element so as to turn off the auxiliary switching element when the main switching element is on or "closed" and to turn on the auxiliary switching element when the main switching element is off or "open". The auxiliary switching element and the capacitor in the shunt circuit are such that the shunt circuit has a small impedance at low switching frequencies of the main switching element.

6 Claims, 4 Drawing Sheets

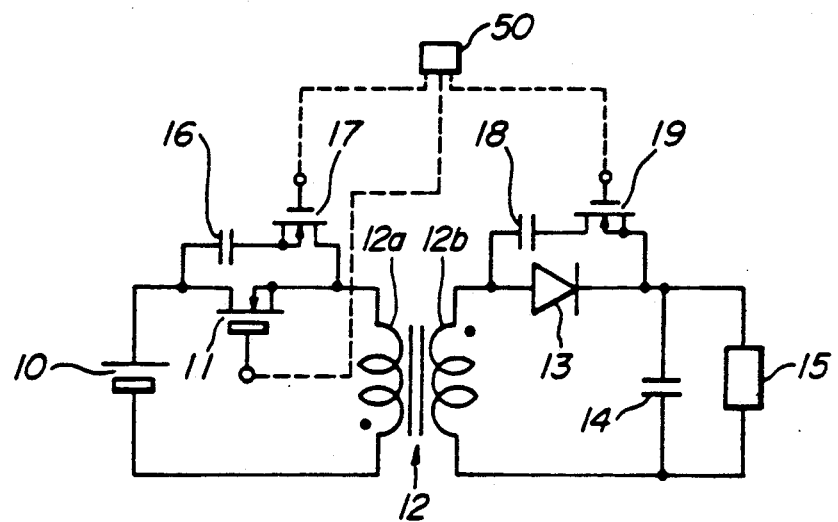
FIG_1
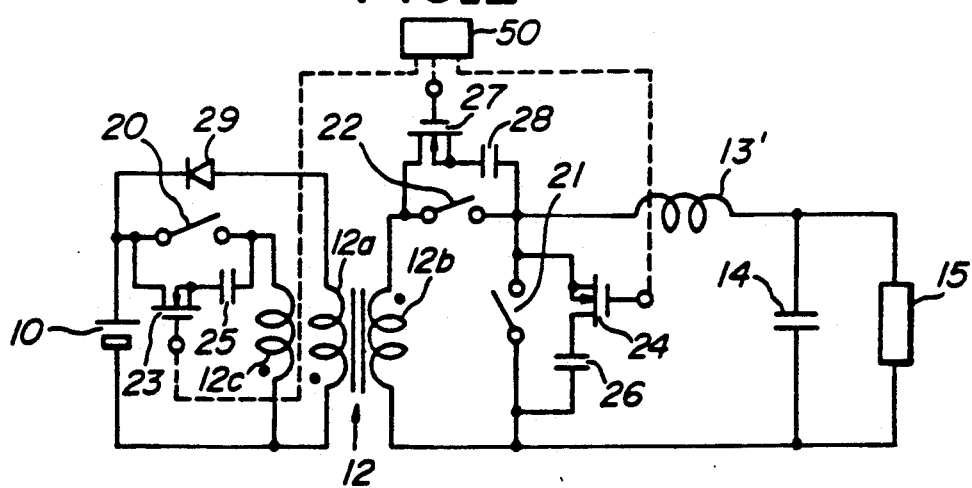
FIG_2

FIG._5
PRIOR ART
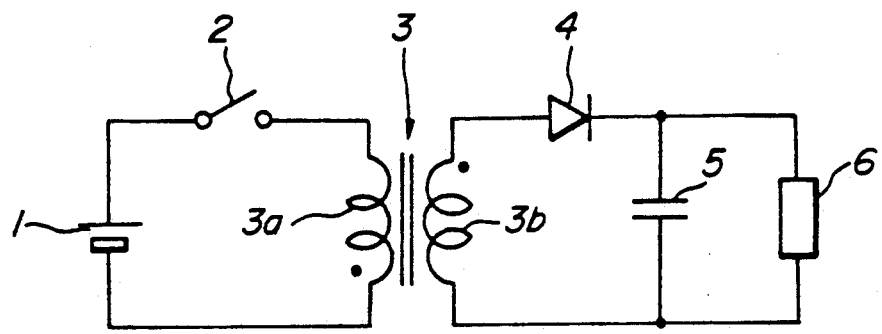
FIG._6
PRIOR ART
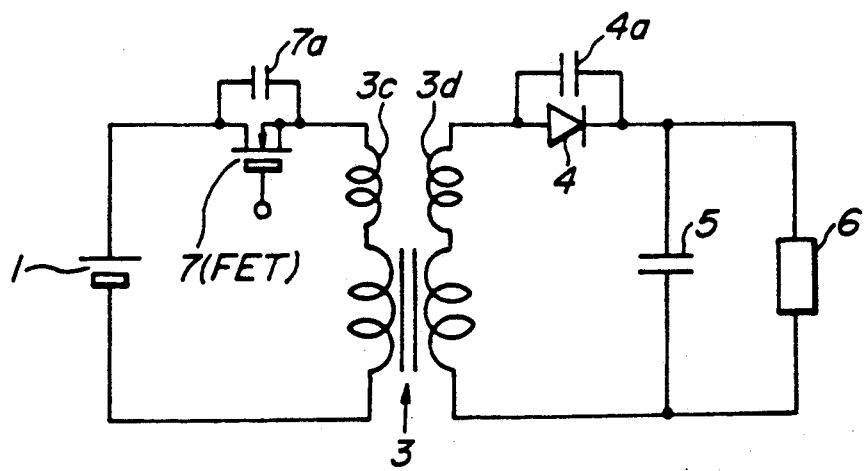

FIG_7A
Voltage across FET
PRIOR ART
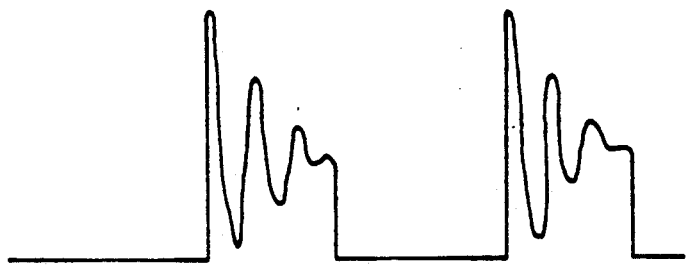
FIG_7B
Voltage across diode
PRIOR ART
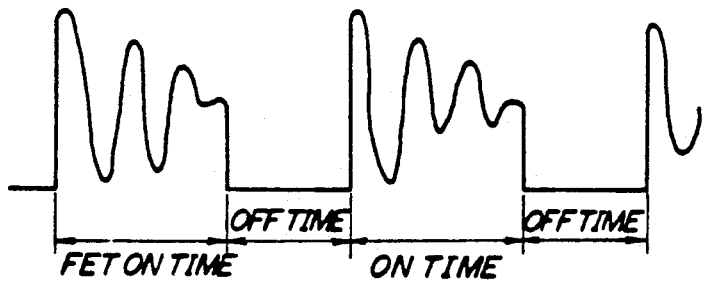

DC-DC CONVERTER WITH SURGE VOLTAGE PREVENTION

BACKGROUND OF THE INVENTION

1. Field of the Invention

This invention relates to a power source means, and in particular, to a power source means which generates a pulse-width-modulated output voltage at the secondary side of a transformer in response to on-off operation of a main switching element in the primary side of the transformer at a duty ratio.

2. Related Art Statement

A switched-mode power source means, which generates a pulse-width-modulated output voltage at a transformer secondary side in response to on-off operation of the transformer primary side at a duty ratio, has been developed and is actually used extensively in electric apparatuses such as those employed for information processing and the like. The reason is that the switching circuit of such a power source means can be made small and has a high efficiency.

FIG. 5 shows a circuit diagram of a typical switched-mode power source means of the prior art. A direct current (DC) source 1 is connected across the primary winding 3a of a transformer 3 through a switch 2. A diode 4 and an output capacitor 5 are connected in series with the secondary winding 3b of the transformer 3, and a load 6 is connected in parallel with the output capacitor 5.

In the figure, black dots indicate the polarity of the windings 3a, 3b of the transformer 3. In operation, when the ON-OFF condition of the switch 2 is controlled, the following duty ratio D is also regulated, so that a pulse-width-modulated rectangular voltage is generated in the secondary winding 3b of the transformer 3 depending on the duty ratio D.

D=(ON time of switch 2)/(repetition period T)

The diode 4 rectifies the rectangular voltage, and the output capacitor 5 smooths the rectified output. If the voltage of the DC source 1 is represented by Ei and the voltage across the output capacitor 5, i.e., the output voltage, is represented by Eo, one can derive the following relationship.

Eo=(nEiD)/(1−D)

Where, n is the turn ratio between the primary and secondary windings of the transformer 3.

The above relationship between the DC source voltage Ei and the output voltage Eo holds only when the constituent devices of the circuit of FIG. 5, such as the switch 2, the diode 4 and the transformer 3 are of ideal nature and free from parasitic reactances. However, actual devices have inherent parasitic reactances, and the switching operation of the switch 2 inevitably generates noise. The generation of such noise will be described by referring to a case in which the switch 2 is a field effect transistor (FET).

FIG. 6 shows a power source means which is similar to the power source means of FIG. 5 except that the switch 2 is replaced by an FET 7, that the FET 7 and the diode 4 have parasitic capacitances 7a and 4a (such as several hundred pF~several ten nF), respectively, and that primary and secondary windings 3a and 3b of transformer have leakage inductances 3c, 3d of about several μH, respectively. In particular, the parasitic capacitance 7a between the drain and source of FET 7 is of several tends of nF to several hundreds pF. The leakage inductances of the primary winding 3c and the secondary winding 3d of the transformer 3 arise in the order of several μH.

When the FET 7 is ON, energy is stored in the leakage inductance 3c of the transformer 3 by the current through the FET 7 and the transformer primary winding 3a. As the FET 7 is turned OFF, the energy stored in the leakage inductance 3c is discharged through the drain-source parasitic capacitance 7a of the FET 7 in the form of a current therethrough, and an oscillation is caused between the leakage inductance 3c and the parasitic capacitance 7a. Similar oscillation is caused in the circuit of the leakage inductance 3d of the transformer 3 and the parasitic, capacitance 4a of the diode 4. FIG. 7A shows the resulting voltage oscillation across the FET 7, and FIG. 7B shows the resulting voltage oscillation across the diode 4.

The voltage oscillations, or surge voltages, due to the parasitic reactances sometimes are two to three times as high as the voltage Ei of the DC source, and such high surge voltages are harmful to switching elements and transformer windings. To prevent the occurrence of high surge voltages, elements for suppressing a quick change of voltage, such as snubber circuits made of serial circuits having resistors and capacitors, have been connected in parallel to the switching elements.

More specifically, one of the conventional methods for protecting elements from surge voltages accompanying the operation of the switching elements is to connect a gate resistor of several hundreds of ohms to the gate of the FET, so as to slow down the rise of gate voltage and to gradually reduce the drain-source resistance of the FET at the time of being turned ON. Such gate resistor suppresses the peak value of the surge current in the FET. Other examples of the conventionally used methods for protection against the surge voltage are connection of a saturable core in series with the FET and connection of snubber circuits or the like referred to above to the switching elements.

The conventional methods for protection against the surge voltage, however, have disadvantages in that the occurrence of surge voltages cannot be completely prevented, power consumption in the snubber circuits increases with on increase of the switching frequency and heat generation at the resistors of the snubber circuits increases accordingly.

SUMMARY OF THE INVENTION

Therefore, an object of the present invention is to solve the above disadvantages of the prior art by providing an improved power source means in which the occurrence of surge voltages is prevented by a circuit of simple construction. With the invention, a high power efficiency is ensured even at higher switching frequencies.

Another object of the present invention is to provide a power source means comprising a direct current (DC) source, a transformer having a primary winding and a secondary winding, a main switching element connected between said DC source and the primary winding of said transformer, a shunt circuit connected in parallel with said main switching element, said shunt circuit being a serial circuit having an auxiliary switching element and a capacitor, and a control circuit connected to said main switching element so as to operate said main switching element at such a duty ratio that a pulse-width-modulated output voltage is generated at the secondary winding of said transformer depending on the duty ratio, said control circuit being also connected to the auxiliary switching element of said shunt circuit so as to make the auxiliary switching element non-conductive when said main switching element is conductive and to make the auxiliary switching element conductive when said main switching element is non-conductive, the auxiliary switching element and the capacitor in said shunt circuit being such that the impedance of said shunt circuit is small at low switching frequencies of the main switching element.

Still another object of the present invention is to provide a power source means which further comprises at least one secondary-side switching element connected to the secondary winding of said transformer, and at least one secondary-side shunt circuit connected in parallel to the secondary-side switching element, said secondary-side shunt circuit being a serial circuit having an auxiliary switching element and a capacitor.

Still another object of the present invention is to provide a power source means comprising a capacitor of said shunt circuit which has a static capacitance at least ten times as large as the parasitic capacitance of said main switching element.

Still another object of the present invention is to provide a power source means in which the capacitor of said secondary-side shunt circuit, has a static capacitance at least ten time as large as the parasitic capacitance of said secondary-side switching element.

A power source means according to the invention uses a direct current (DC) source connected to the primary winding of a transformer through a main switching element. The transformer has a secondary winding on which an output voltage is induced in response to ON-OFF operation of the main switching element. A shunt circuit is connected in parallel with the main switching element, which shunt circuit is a serial circuit having an auxiliary switching element and a capacitor.

A control circuit is connected to the main switching element so as to operate the main switching element at such a duty ratio (i.e. the ratio between ON time and the period of switching repetition of the main switching element) that a pulse-width-modulated output voltage depending on the duty ratio is generated at the secondary winding of the transformer. The control circuit is also connected to the auxiliary switching element of the shunt circuit so as to make the auxiliary switching element non-conductive when the main switching element is conductive and to make the auxiliary switching element conductive when the main switching element is non-conductive. There is also a short dead time when two switches are both OFF in order to realize zero-voltage switching. The switching losses are reduced due to zero-voltage switching. The auxiliary switching element and the capacitor in the shunt circuit are such that the impedance of the shunt circuit is small.

In the power source means of the above configuration, when the main switching element is turned off, that is, from the conductive state to the non-conductive state, a capacitor of large static capacitance is inserted in the primary winding circuit of the transformer in lieu of the main switching element, so that the main switching element is short circuited by a low impedance. Consequently, the voltage across the main switching element in the OFF state is maintained at a substantially constant level, and the occurrence of the surge voltage is substantially prevented.

BRIEF DESCRIPTION OF THE DRAWINGS

For a better understanding of the invention, reference is made to the accompanying drawings, in which:

FIG. 1 is a circuit diagram of an embodiment of the power source means according to the invention;

FIG. 2 through FIG. 4 are circuit diagrams of different embodiments of the power source means according to the invention;

FIG. 5 and FIG. 6 are circuit diagrams of power source means of the prior art; and FIG. 7A and FIG. 7B are graphs showing oscillatory voltages generated across different elements of the power source means of FIG. 6, respectively.

Figure 3:
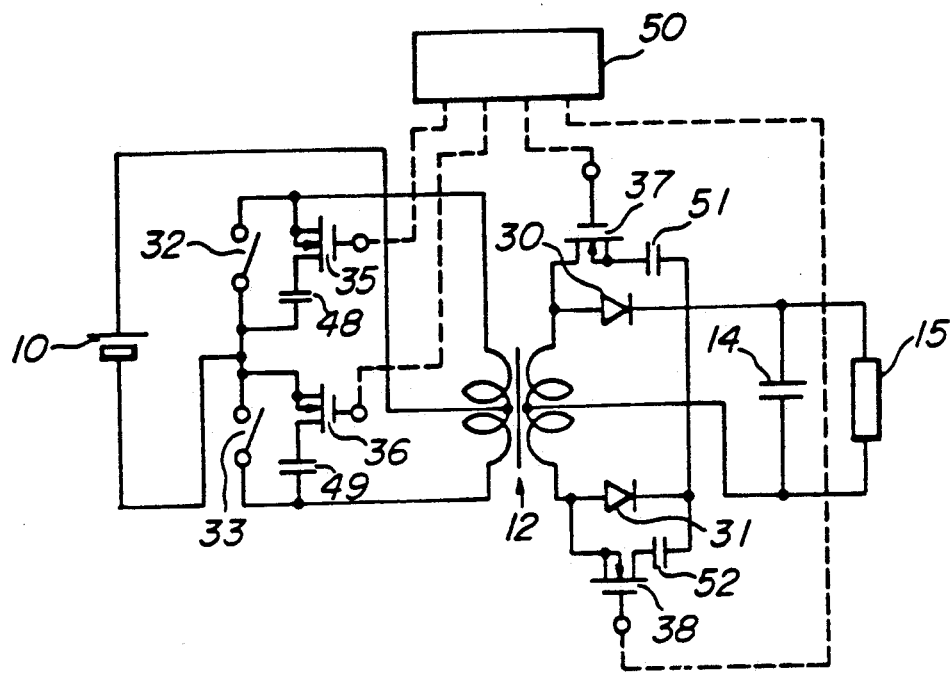

Throughout different views of the drawings, 1, 10 are direct current (DC) sources; 2 is a switch; 3, 12 are transformers; 4 is a diode; 5, 14 are output capacitors; 6, 15 are loads; 7 is a field effect transistor (FET); 11, 20, 32, 33, 42, 43 are main switching elements; 13, 21, 22, 30, 31, 40, 41 are secondary-side switching elements; 16, 18, 25, 26, 28 are capacitors; 17, 19, 23, 24, 27 are auxiliary switching elements; 29 is a switching element; 35, 36, 37, 38, 53, 54 are auxiliary switching elements; 46, 47, 48, 49, 51, 52 are capacitors; and 50 and 50' are control elements.

DESCRIPTION OF THE PREFERRED EMBODIMENTS

FIG. 1 is a circuit diagram showing the configuration of an embodiment of the power source means according to the invention. A main switching element 11 is connected between a DC source 10 and the primary winding 12a of a transformer 12. In this embodiment, the main switching element 11 is an FET. A secondary-side switching element 13 is connected between the secondary winding 12b of the transformer 12 and an output capacitor 14, which secondary-side switching element 13 is a diode in this embodiment. A load 15 is connected across the output capacitor 14. It is important in the invention to prevent occurrence of surge voltage at the time of ON-OFF switching of the main switching element 11 by connecting a shunt circuit across the main switching element 11, which shunt circuit is a serial circuit made of a capacitor 16 and an auxiliary switching element 17. The auxiliary switching element 17 is also an FET in the illustrated embodiment.

Preferably, a secondary-side shunt circuit is connected across the secondary-side switching element 13, which secondary-side shunt circuit is a serial circuit made of a capacitor 18 and an auxiliary switching element 19. In the embodiment of FIG. 1, an FET is used as the auxiliary switching element 19.

The main switching element 11 and the two auxiliary switching elements 17, 19 are connected to a control element 50. According to the invention, the control element 50 is such that, when the main switching element 11 is turned ON or made conductive, the auxiliary switching element 17 is turned OFF or made non-conductive, and when the main switching element 11 is turned OFF or made non-conductive, the auxiliary switching element 17 is turned ON or made conductive. Similarly, when the secondary-side switching element 13 such as the diode is turned ON or conductive, the auxiliary switching element 19 such as the FET is turned OFF or made non-conductive, and when the secondary-side switching element 13 is turned OFF or non-conductive, the auxiliary switching element 19 is turned ON or made conductive.

The static capacitance of the capacitor 16 in the shunt circuit for the main switching element 11 such as the FET is at least ten times, preferably several tens of times, as large as the parasitic capacitance of the main switching element 11. For instance, the static capacitance of the capacitor 16 may be selected at about 0.1 $\mu F$. Similarly, the static capacitance of the capacitor 18 in the shunt circuit for the secondary-side switching element 13 such as the diode is at least ten times, preferably several tens of times, as large as the parasitic capacitance of the secondary-side switching element 13.

In operation, under the regulation of the control element 50, the main switching element 11 repeats the switching operations at a desired repetition frequency, and a pulse-width-modulated rectangular voltage is induced in the secondary winding 12b of the transformer 12. Whenever the main switching element 11 is turned OFF or made non-conductive, the auxiliary switching element 17 is turned ON or made conductive so as to short circuit the main switching element 11 through a low impedance at low frequencies.

More specifically, the capacitor 16 in the shunt circuit for the main switching element 11 has a static capacitance which is at least ten times, preferably several tens of times, as large as the parasitic capacitance of the main switching element 11. When the main switching element 11 is turned OFF and the resonance is induced, the resonant frequency of the primary winding circuit of the transformer 12 becomes lower than that with the parasitic capacitance of the main switching element 11 alone. Hence, even if resonance occur between the capacitor 16 and the leakage inductance of the transformer primary winding 12a, the resonant frequency should be only about one tenth or smaller of that without the shunt circuit having capacitor 16, and the voltage across the main switching element 11 is kept substantially constant.

On the other hand, when the main switching element 11 is turned ON, that is, made conductive from the non-conductive state, the auxiliary switching element 17 is turned OFF and the voltage of the capacitor 16 is held at the level it had when the switch 17 was turned off. Thus, there is no power loss in the capacitor 16 when the main switching element 11 is conductive.

The shunt circuit of the secondary-side switching element 13, or a diode in the case of FIG. 1, functions similarly. More specifically, when the secondary-side switching element 13 is turned OFF from its conductive state, the auxiliary switching element 19 is turned ON so as to close the shunt circuit through the capacitor 18 which has a large static capacitance. Hence, even when resonance is caused between the capacitor 18 of the shunt circuit and the leakage inductance of the transformer secondary winding 12b, the resonant frequency is very low, and the voltage across the secondary-side switching element 13 is kept substantially constant and occurrence of a surge voltage is prevented.

FIG. 2 shows another embodiment of the power source means according to the invention. Like parts to those of FIG. 1 are designated by like numerals. This embodiment represents a forward type power source means with the shunt circuit of the invention. A main switching element 20 is connected to the primary side of the transformer 12. Two secondary-side switching elements 21 and 22 are provided on the secondary-side of the transformer 12; i.e., the switch element 22 is in series with the secondary winding 12b of the transformer, and the switching element 21 shunts the secondary winding 12b of transformer 12 through the switching element 22.

The secondary-side switching element 21 is controlled by a control element 50 similar to that of FIG. 1 so as to operate in an opposite manner to the main switching element 20; namely, when one of the two switching elements is conductive, the other is non-conductive. The other secondary-side switching element 22 is controlled so that its operation substantially corresponds to that of the main switching element 20. In the forward type power source means of this embodiment, each of the switching elements 20, 21 and 22 has a shunt circuit formed of capacitors 25, 26, 28, respectively, and an auxiliary switching elements 23, 24, 27 (e.g., an FET) connected in series thereto. Such shunt circuits are effective in preventing the occurrence of the above-mentioned voltage surge.

FIG. 3 shows another embodiment of the invention, in which an AC voltage is produced by an inverter circuit and the AC voltage is applied to a transformer, and secondary-side switching elements (diodes) 30, 31 rectify the induced secondary-side voltage so as to produce a DC output voltage. With the invention, each of the main switching elements (i.e., inverter switches) 32, 33 and the secondary-side switching element 30, 31 has a shunt circuit, which shunt circuit is formed of a serial circuit having capacitors 48, 49, 51, 52 and auxiliary switching elements 35, 36, 37, 38 (e.g., an FET) connected thereto. The shunt circuits are effective in preventing the occurrence of a voltage surge at the time of the switching operation.

Figure 4:
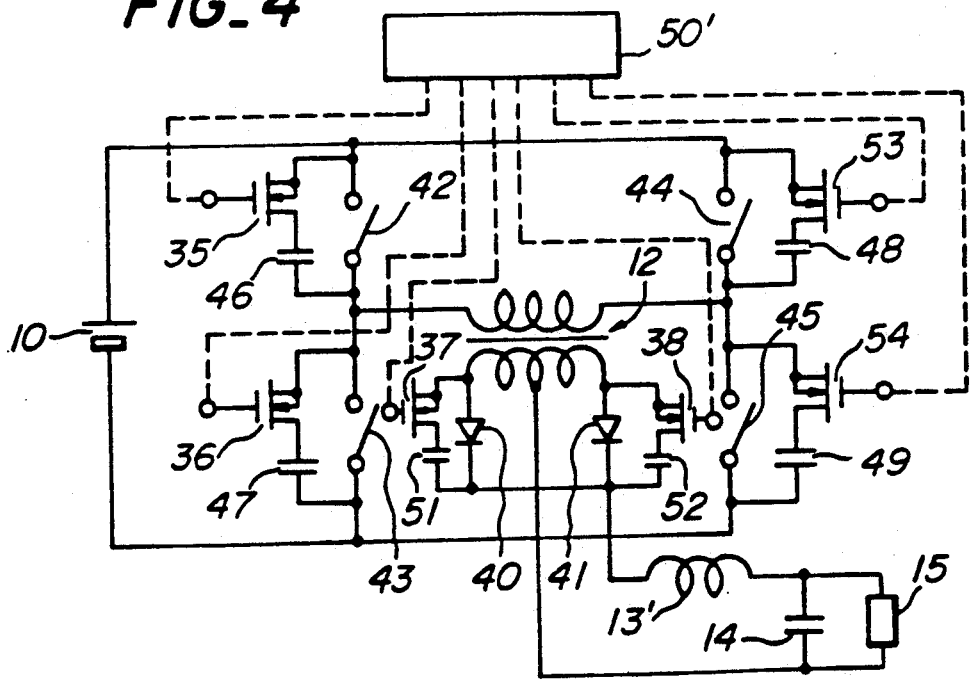

FIG. 4 shows another power source means according to the invention, which also includes an inverter. In this embodiment, an AC voltage is produced by a full-bridge type inverter circuit and the AC voltage is applied to a transformer, and secondary-side switching elements (diodes) 40, 41 rectify the induced secondary-side voltage so as to produce a DC output voltage, All the switching elements 35, 36, 37, 38, 53, 54 are connected to a control element 50' similar to element 50 of FIG. 1. Two main switching elements (inverter switches) 42 and 44 are controlled so as to form a pair wherein when one switching element is conductive the other switching element is non-conductive. Other two main switching elements (inverter switches) 43, 45 are controlled so as to form a similar pair. The control element operates the above switching elements while regulating the phase difference between the two pairs of main switching elements, i.e. the pair of 42, 44 and the other pair of 43, 45, so as to regulate the pulse width of the pulse-width-modulated output of the transformer 12.

In the embodiment of FIG. 4, each of the main switching elements (i.e., inverter switches) 42, 43, 44, 45 and the secondary-side switching element 40, 41 has a shunt circuit, which shunt circuits are formed of serial circuits having large-capacitance capacitors 46, 47, 48, 49 and 51, 52 and auxiliary switching elements 35, 36, 37, 38, 53, 54 (e.g., an FET) connected thereto. Such shunt circuits substantially prevent the occurrence of a voltage surge at the time of the switching operation.

It is noted here that the invention is not restricted to the above embodiments and various changes and modifications are possible. For instance, the FET which is used as the switching element in the illustrated embodiments may be replaced by a bipolar transistor or a thyristor.

As described in detail in the foregoing, when each of the main and secondary-side switching elements is turned OFF to a non-conductive state, it is shunted by a low impedance circuit with a low resonant frequency, which shunting is effective in preventing the occurrence of a voltage surge. Thereby, power efficiency in the power source means is enhanced and the switching noise is reduced, so as to improve the durability of the various circuit elements. Further, the invention facilitates the use of a higher switching frequency of the power source means as compared with that of the conventional power source means.

Although the invention has been described with a certain degree of particularity, it is understood that the present disclosure has been made only by way of example and that numerous changes in details may be resorted to without departing from the scope of the invention as hereinafter claimed.

What is claimed is:

1. A power source apparatus comprising:
   a direct current source;
   a transformer having at least one primary and at least one secondary winding;
   a main switching element connected between said direct current source and a primary winding of said transformer;
   a primary-side shunt circuit connected in parallel with said main switching element, said primary-side shunt circuit being a serial connection of a first auxiliary switching element and a capacitor;
   at least one secondary-side switching element connected to the secondary winding of said transformer;
   at least one secondary-side shunt circuit connected in parallel with respective secondary-side switching element, said secondary-side shunt circuit being a serial connection of a second auxiliary switching element and a capacitor; and
   control circuit means connected to said main switching element for turning on and off said main switching element to produce a pulse-width-modulated output voltage across the secondary winding of said transformer, said control circuit means also being connected to said first auxiliary switching element of said primary-side shunt circuit for operating said first auxiliary switching element to turn it off when said main switching element is on and to turn said first auxiliary switching element on only when said main switching element is off, and said control circuit means being further connected to said at least one second auxiliary switching element for operating said second auxiliary element to turn it on when a respective secondary-side switching element is off and to turn said second auxiliary element off when a respective secondary-side switching element is on.

2. A power source apparatus as set forth in claim 1, wherein the capacitor of said primary-side shunt circuit has a static capacitance at least ten times as large as the parasitic capacitance of said main switching element.

3. A power source means as set forth in claim 1, wherein the capacitor of said secondary-side shunt circuit has a static capacitance at least ten times as large as the parasitic capacitance of a respective secondary-side switching element.

4. A power source means as set forth in claim 1, wherein the capacitors of said primary-side and secondary-side shunt circuits each have a static capacitance at least ten times as large as the parasitic capacitance of said main and respective secondary-side switching elements, respectively.

5. A power supplying apparatus comprising:
   a transformer having at least one primary winding and at least one secondary winding, each winding having a respective first and second terminal;
   a direct current voltage source having a positive and a negative terminal, one of said terminals being directly connected to the second terminal of said primary winding;
   an FET main switching element connected between the first terminal of said primary winding and the other terminal of said voltage source;
   a primary-side shunt circuit, including a first FET auxiliary switching element in series with a capacitor, connected in parallel with said main switching element;
   a diode secondary-side switching element connected at its anode to the first terminal of said secondary winding and at its cathode to a first load terminal;
   an output capacitor connected between the cathode of said diode secondary-side switching element and the second terminal of said secondary winding;
   a secondary-side shunt circuit, including a second FET auxiliary switching element in series with a capacitor, connected in parallel with said diode secondary-side switching element;
   a control element connected to all of the FET switching elements at the gates thereof, for controlling the on and off states of said FET switching elements so that said first FET auxiliary switching element is on only when said FET main switching element is off, and so that said second FET auxiliary switching element is on only when said diode secondary switching element is off.

6. A power supplying apparatus comprising:
   a transformer having first and second primary windings and a secondary winding, each of said windings having a respective first and second terminal, the primary windings being connected together at the first terminals thereof;
   a voltage source having a positive and a negative terminal, one of said terminals being connected directly to the first terminals of said first and second primary windings;
   a main switching element connected between the second terminal of said first primary winding and the other terminal of said voltage source;
   a primary-side shunt circuit, including a first FET auxiliary switching element in series with a capacitor, connected in parallel with said main switching element;
   a diode having one terminal connected to the second terminal of said second primary winding and the other terminal to the other terminal of said voltage source;
   a first secondary-side switching element connected at a first terminal thereof to the first terminal of said secondary winding, and at a second terminal thereof to a first terminal of an output filter, a terminal of said output filter being connected to the second terminal of said secondary winding and a first load terminal, and a third terminal of said output filter being connected to a second load terminal;
   a second secondary-side switching element connected between the second terminal of said secondary winding and the second terminal of said first secondary-side switching element;

a first secondary-side shunt circuit, including a second FET auxiliary switching element in series with a capacitor, connected in parallel with said first secondary-side switching element;

a second secondary-side shunt circuit, including a third FET auxiliary switching element in series with a capacitor, connected in parallel with said second secondary-side switching element;

a control element for controlling the first, second and third FET auxiliary switching elements connected to the gates thereof for controlling the on and off states of said auxiliary switching elements so that said first FET auxiliary switching element is on only when said main switching element is off, said second FET auxiliary switching element is on only when said first secondary-side switching element is off, and said third FET auxiliary switching element is on only when said secondary-side switching element is off.

* * * * *